(12) United States Patent
Yang et al.

(10) Patent No.: US 8,958,281 B2
(45) Date of Patent: Feb. 17, 2015

(54) EARLY TERMINATION OF A BASE STATION IDENTITY CODE PROCEDURE IN TD-SDCMA

(71) Applicant: QUALCOMM Incorporated, San Diego, CA (US)

(72) Inventors: Ming Yang, San Diego, CA (US); Tom Chin, San Diego, CA (US); Qingxin Chen, Del Mar, CA (US); Guangming Shi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 156 days.

(21) Appl. No.: 13/777,686

(22) Filed: Feb. 26, 2013

(65) Prior Publication Data

US 2014/0241143 A1 Aug. 28, 2014

(51) Int. Cl.
| H04J 1/16 | (2006.01) |
| H04J 3/14 | (2006.01) |
| H04W 24/02 | (2009.01) |
| H04W 36/14 | (2009.01) |
| H04W 36/00 | (2009.01) |

(52) U.S. Cl.
CPC ............. *H04W 24/02* (2013.01); *H04W 36/14* (2013.01); *H04W 36/0088* (2013.01)
USPC ............ 370/216; 370/334; 455/437; 455/443

(58) Field of Classification Search
None
See application file for complete search history.

(56) References Cited

U.S. PATENT DOCUMENTS

| 2004/0002334 A1* | 1/2004 | Lee et al. ................ 455/436 |
| 2004/0235478 A1* | 11/2004 | Lindquist et al. ........... 455/440 |
| 2008/0318577 A1 | 12/2008 | Somasundaram et al. |
| 2009/0137246 A1* | 5/2009 | Xing et al. ................ 455/434 |
| 2010/0002611 A1 | 1/2010 | Umatt et al. |
| 2010/0035610 A1 | 2/2010 | Narang et al. |
| 2011/0243119 A1* | 10/2011 | Chin et al. .............. 370/342 |
| 2011/0280141 A1 | 11/2011 | Chin et al. |
| 2012/0307657 A1* | 12/2012 | Orjmark et al. ........... 370/252 |
| 2013/0308481 A1* | 11/2013 | Kazmi et al. ............. 370/252 |
| 2014/0162650 A1* | 6/2014 | Islam et al. .............. 455/436 |

FOREIGN PATENT DOCUMENTS

| CN | 101247621 A | 8/2008 |
| EP | 1566983 A2 | 8/2005 |

OTHER PUBLICATIONS

Co-pending U.S. Appl. No. 13/516,651, filed Oct. 4, 2012.

(Continued)

*Primary Examiner* — Ian N Moore
*Assistant Examiner* — Eric P Smith
(74) *Attorney, Agent, or Firm* — Seyfarth Shaw LLP

(57) ABSTRACT

An early BSIC (base station identity code) abort procedure includes comparing a first signal strength of a serving cell with a first threshold and comparing a second signal strength of a target cell to a second threshold. The first threshold is a sum of a network indicated threshold and a user equipment (UE) threshold. The second threshold is a difference between the network indicated threshold and the UE threshold. When the first signal strength is below the first threshold and the second signal strength is above the second threshold, the base station identity code (BSIC) procedure is initiated. A number of BSIC failure attempts is adaptively set before terminating the BSIC procedure.

22 Claims, 7 Drawing Sheets

(56) References Cited

OTHER PUBLICATIONS

"3rd Generation Partnership Project; Technical Specification Group Radio Access Network; Evolved Universal Terrestrial Radio Access (E-UTRA); Requirements for support of radio resource management (Release 9)", 3GPP2 Draft; 36133-9B0, 3rd Generation Partnership Project 2, 3GPP2, 2500 Wilson Boulevard, Suite 300, Arlington, Virginia 22201; USA, vol. TSGC Apr. 16, 2012, pp. 1-489, XP062178898.

Ad Hoc 8 Leader: "Report of Ad Hoc 8 meeting held during WG1#3 Document: Approval", 3GPP Draft; R1-99307, 3rd Generation Partnership Project (3GPP), Mobile Competence Centre; 650, Route Des Lucioles; F-06921 Sophia-Antipolis Cedex; France, vol. RAN WG1, no. NynA shamn; Mar. 30, 1999, XP050088447.

International Search Report and Written Opinion—PCT/US2014/018035—ISA/EPO—Jul. 21, 2014.

Samsung "Correction to the reference in section 14.9.2", 3GPP Draft; 25331_CRXXXX_(REL-9)_R2-097050 Editorial, 3rd Generation Partnership Project (3GPP), Mobile Competence Centre; 650, Route Des Lucioles; F-06921 Sophia-Antipolis Cedex; France, no. Jeju; Nov. 9, 2009, XP050390835.

\* cited by examiner

EARLY TERMINATION OF A BASE STATION IDENTITY CODE PROCEDURE IN TD-SDCMA

TECHNICAL FIELD

Aspects of the present disclosure relate generally to wireless communication systems, and more particularly, to an intelligent early base station identity code (BSIC) abort method in a Time Division-Synchronous Code Division Multiple Access (TD-SCDMA) network.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes comparing a first signal strength of a time division synchronous code division multiple access (TD-SCDMA) serving cell with a first threshold and comparing a second signal strength of a target global system for mobile communications (GSM) cell to a second threshold. The first threshold is a sum of a network indicated threshold and a user equipment (UE) threshold, and the second threshold is a difference between the network indicated threshold and the UE threshold. When the first signal strength is below the first threshold and the second signal strength is above the second threshold, the base station identity code (BSIC) procedure is initiated. A number of BSIC failure attempts is adaptively set before terminating the BSIC procedure.

Another aspect discloses an apparatus for wireless communication having a memory and at least one processor coupled to the memory. The processor(s) is configured to compare a first signal strength of a TD-SCDMA serving cell with a first threshold. The first threshold is a sum of a network indicated threshold and a UE threshold. The processor(s) is also configured to compare a second signal strength of a target GSM cell to a second threshold. The second threshold is a difference between the network indicated threshold and the UE threshold. When the first signal strength is below the first threshold and the second signal strength is above the second threshold, the processor(s) is configured to initiate a BSIC procedure. Further, the processor(s) is configured to adaptively set a number of BSIC failure attempts before terminating the BSIC procedure.

In another aspect an apparatus is disclosed that includes means for comparing a first signal strength of a TD-SCDMA serving cell with a first threshold. The first threshold is a sum of a network indicated threshold and a UE threshold. Also included is a means for comparing a second signal strength of a target GSM cell to a second threshold. The second threshold is a difference between the network indicated threshold and the UE threshold. The apparatus also includes means for initiating a BSIC procedure when the first signal strength is below the first threshold and the second signal strength is above the second threshold. Means for adaptively setting a number of BSIC failure attempts before terminating the BSIC procedure is also included.

Another aspect discloses a computer program product for wireless communications in a wireless network having a non-transitory computer-readable medium. The computer readable medium has non-transitory program code recorded thereon which, when executed by the processor(s), causes the processor(s) to perform operations of comparing a first signal strength of a TD-SCDMA serving cell with a first threshold, in which the first threshold is a sum of a network indicated threshold and a UE threshold. The processor(s) is also configured to compare a second signal strength of a target GSM cell to a second threshold, in which the second threshold is a difference between the network indicated threshold and the UE threshold. The processor(s) is also configured to initiate a BSIC procedure, if the first signal strength is below the first threshold and the second signal strength is above the second threshold. The processor(s) is also configured to adaptively set a number of BSIC failure attempts before terminating the BSIC procedure.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
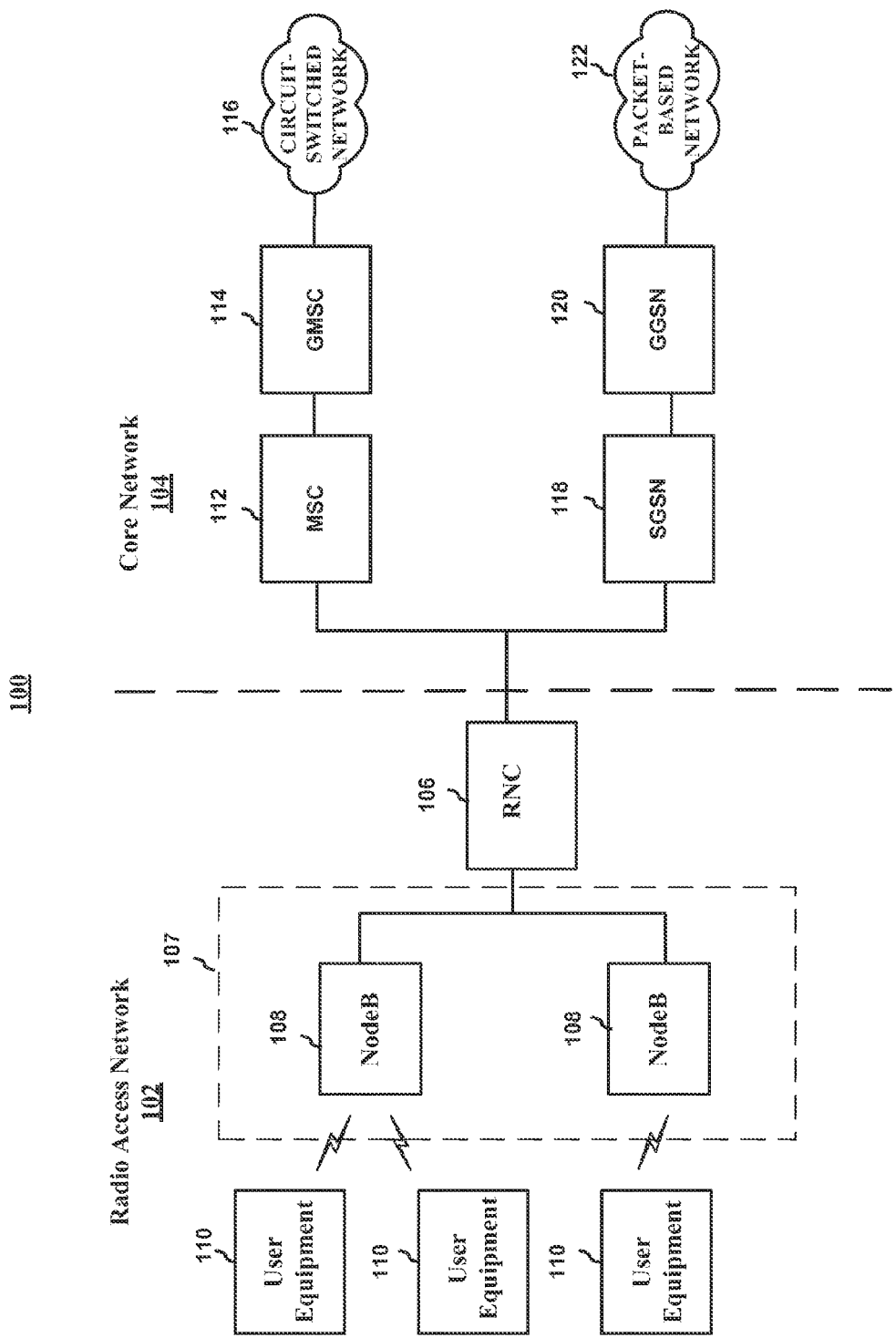
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
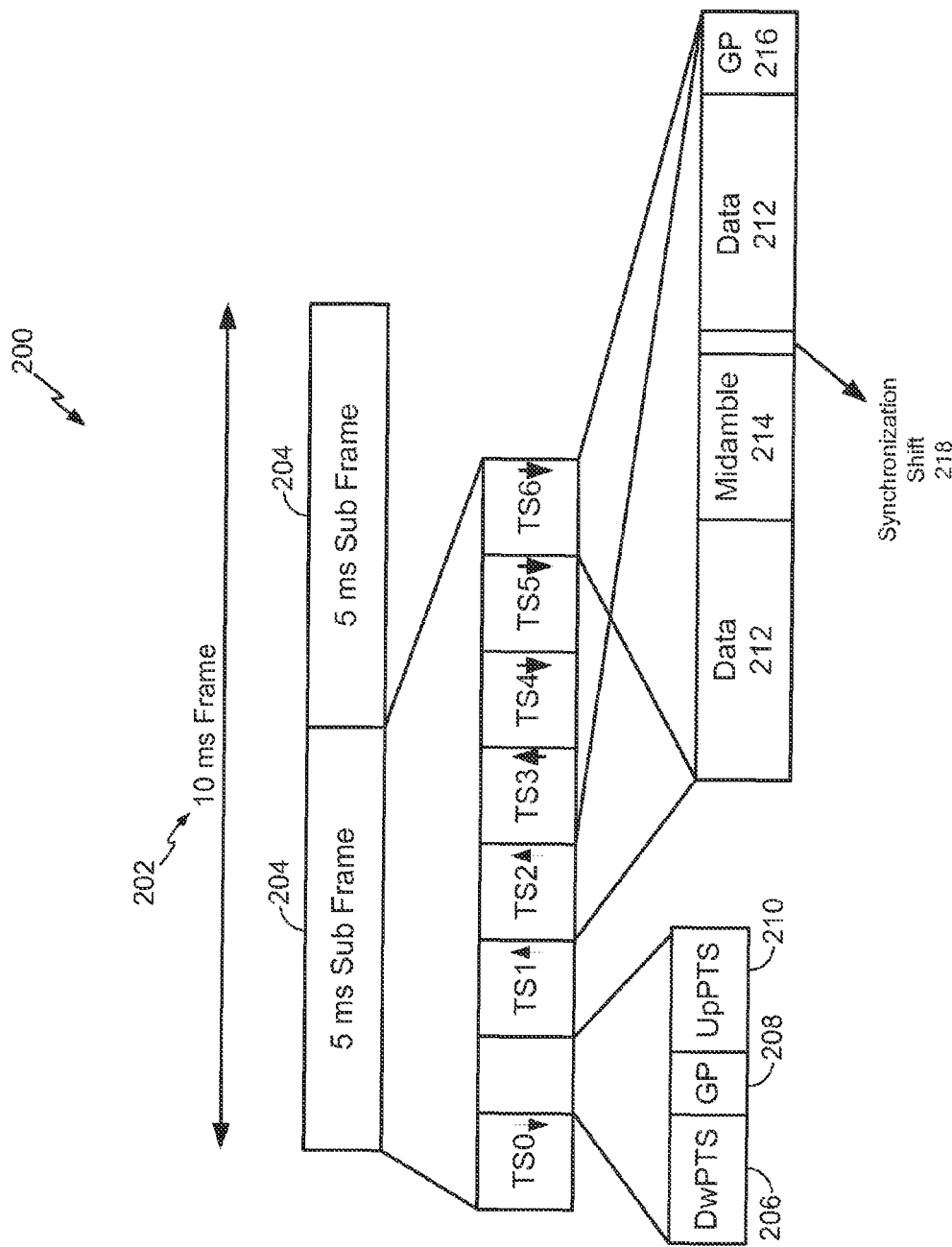
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
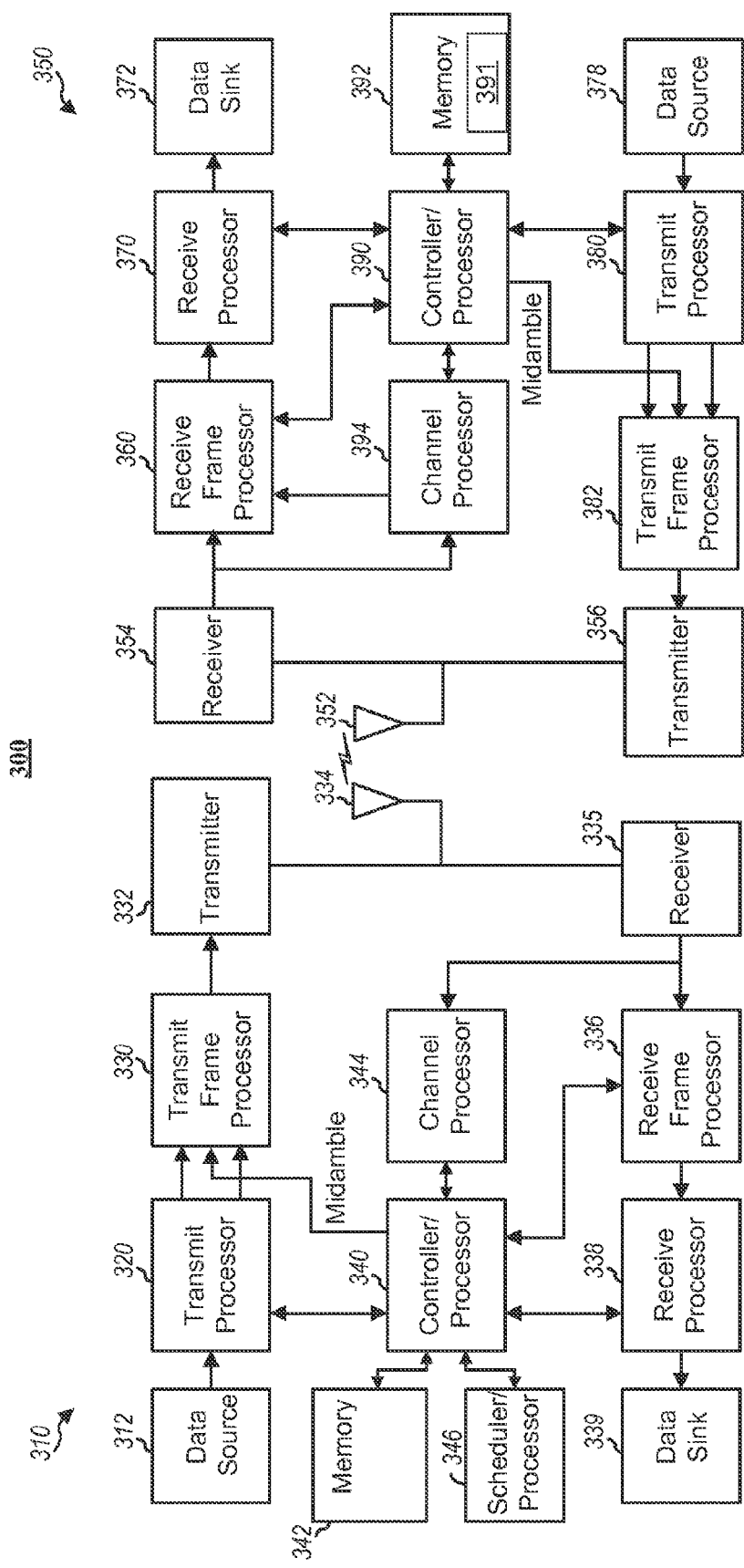
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 35—may store BSIC process terminator module 391 which, when executed by the controller/processor 390, configures the UE 350 to perform an intelligent early BSIC abort method. A scheduler/processor 346 at the node B 310 may be used to allocate resources to the UEs and schedule downlink and/or uplink transmissions for the UEs.

Figure 4A:
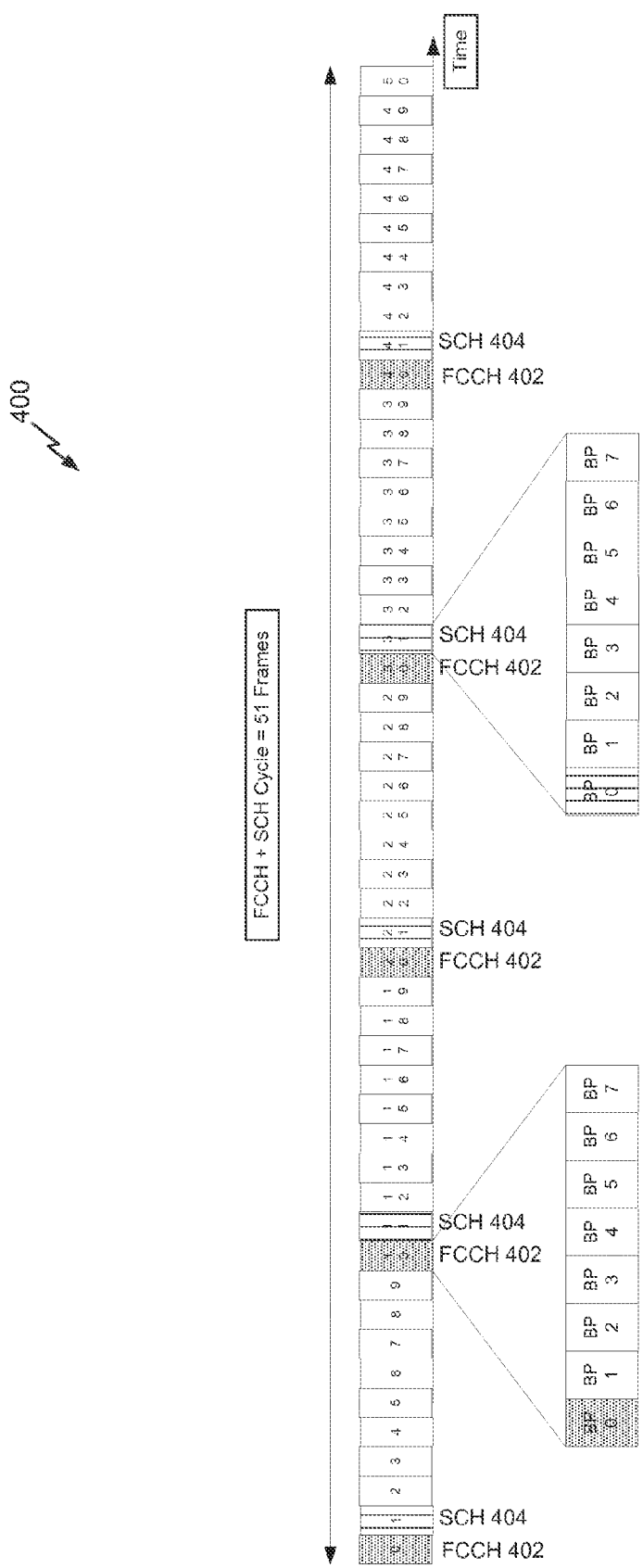
FIG. 4A is a block diagram illustrating a GSM frame cycle

FIG. 4A is a block diagram illustrating a GSM frame cycle 400. The GSM frame cycle for frequency correction channel (FCCH) 402 and synchronization channel (SCH) 404 consists of 51 frames, each of eight burst periods (BP). The FCCH 402 is in the first burst period (or BP 0) of frame 0, 10, 20, 30, 40, and the SCH 404 is in the first burst period of frame 1, 11, 21, 31, 41. A single burst period is 15/26 ms and a single frame is 120/26 ms. As shown in FIG. 4A, the FCCH period is 10 frames (46.15 ms) or 11 frames (51.77 ms). Also as shown, the SCH period is 10 frames or 11 frames.

Figure 4B:
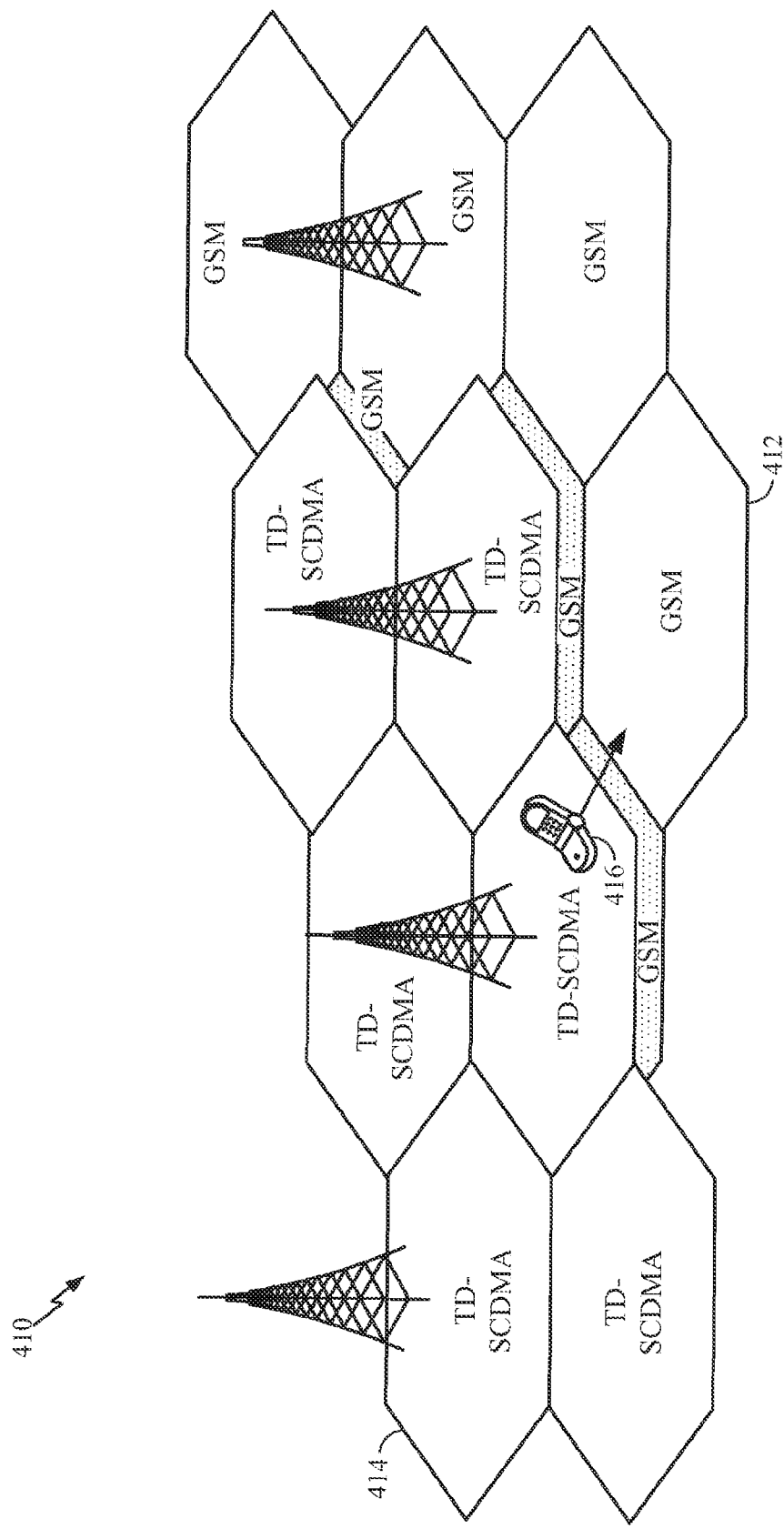
FIG. 4B illustrates network coverage areas according to aspects of the present disclosure.

Some networks, such as a newly deployed network, may cover only a portion of a geographical area. Another network, such as an older more established network, may better cover the area, including remaining portions of the geographical area. FIG. 4B illustrates coverage of a newly deployed network, such as a TD-SCDMA network and also coverage of a more established network, such as a GSM network. A geographical area 410 may include GSM cells 412 and TD-SCDMA cells 414. A user equipment (UE) 416 may move from one cell, such as a TD-SCDMA cell 414, to another cell, such as a GSM cell 412. The movement of the UE 416 may specify a handover or a cell reselection.

The handover or cell reselection may be performed when the UE moves from a coverage area of a TD-SCDMA cell to the coverage area of a GSM cell, or vice versa. A handover or cell reselection may also be performed when there is a coverage hole or lack of coverage in the TD-SCDMA network or when there is traffic balancing between the TD-SCDMA and GSM networks. As part of that handover or cell reselection process, while in a connected mode with a first system (e.g., TD-SCDMA) a UE may be specified to perform a measurement of a neighboring cell (such as GSM cell). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The UE may send a serving cell a measurement report indicating results of the IRAT measurement performed by the UE. The serving cell may then trigger a handover of the UE to a new cell in the other RAT based on the measurement report. The triggering may be based on a comparison between measurements of the different RATs. The measurement may include a TD-SCDMA serving cell signal strength, such as a received signal code power (RSCP) for a pilot channel (e.g., primary common control physical channel (P-CCPCH)). The signal strength is compared to a serving system threshold. The serving system threshold can be indicated to the UE through dedicated radio resource control (RRC) signaling from the network. The measurement may also include a GSM neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

Handover of a UE from a serving RAT to a neighbor RAT may occur when the serving cell signal strength is below the serving system threshold. If a target GSM neighbor cell RSSI is above a neighbor system threshold, and the target GSM neighbor cell is identified and reconfirmed by network, the UE sends a measurement report to a serving cell which commences handover.

Early BSIC Abort Method in TD-SDCMA

One aspect of the present disclosure is directed to reducing unnecessary wait time during handover. In particular, one aspect provides a system and process utilizing a base station identity code (BSIC) early abort procedure.

A UE sends a measurement report event 3A, when the TD-SCDMA serving cell RSCP is below a first threshold value (e.g., serving cell threshold value), the target GSM cell RSSI is above a second threshold value (e.g. target cell threshold value), and when the GSM cell requested by the network is identified and reconfirmed. Sending a measurement report triggers UE handover from TD-SCDMA to GSM. The procedure of GSM cell confirmation and reconfirmation is known as the base station identity code (BSIC) procedure. The UE decodes the GSM shared channel (SCH) to determine a GSM cell ID and compares the determined ID with a GSM ID indicated in the measurement control message from the TD-SCDMA network.

A strong received signal strength indicator (RSSI) may be due to strong interference, and may cause the BSIC procedure to fail. Conventionally, the UE waits up to around 5 seconds before it can give up and free the generic access protocol (GAP) for other GSM cells. This wait time may negatively impact inter radio access technology (IRAT) performance when the GAP remains occupied while the UE is waiting for an unnecessary period of time.

One aspect of the present disclosure reduces unnecessary wait time. In particular, when the BSIC process fails for a predefined number, N, times (for example, N=3), then the UE may give up and terminate the BSIC process. The number N may be a function of a GSM cell RSSI value. The stronger the GSM cell, the more times it takes for the UE to terminate the BSIC procedure. In one aspect, the UE terminates the entire BSIC process including the steps of confirming and reconfirming the GSM cell, which as a result frees GAP resources for other GSM cells to use for RSSI measurements and other BSIC procedures.

According to one aspect of the present disclosure, the UE is configured to terminate BSIC procedures earlier, instead of waiting for an unnecessary period of time (e.g., 5 seconds) to expire. This frees up GAP resources for other GSM cells to use for RSSI measurement(s) and other BSIC procedures, thereby improving IRAT performance.

In one aspect, the number of BSIC failure attempts may be based on a RSSI value of the target GSM cell. In another aspect, the number of BSIC failure attempts may be based on a frequency correction channel (FCCH) signal to noise ratio (SNR) of the target GSM cell. Alternately, the number of BSIC failure attempts may be based on a synchronization channel (SCH) signal to noise ratio (SNR) of the target GSM cell. Additionally, the number of BSIC failure attempts may be based on or proportional to a number of GSM neighbor cells adjacent to the target GSM cell.

In another aspect, the number of BSIC failure attempts may be based on a property of a first radio access technology (RAT). The property may include a measurement gap length and/or a gap occurrence rate. For example, the larger the measurement gap length or the higher the gap occurrence rate, the value N could be made lower (to terminate easier) or higher (to terminate less often if the RAT has a particularly large gap length or high gap occurrence rate).

Figure 5:
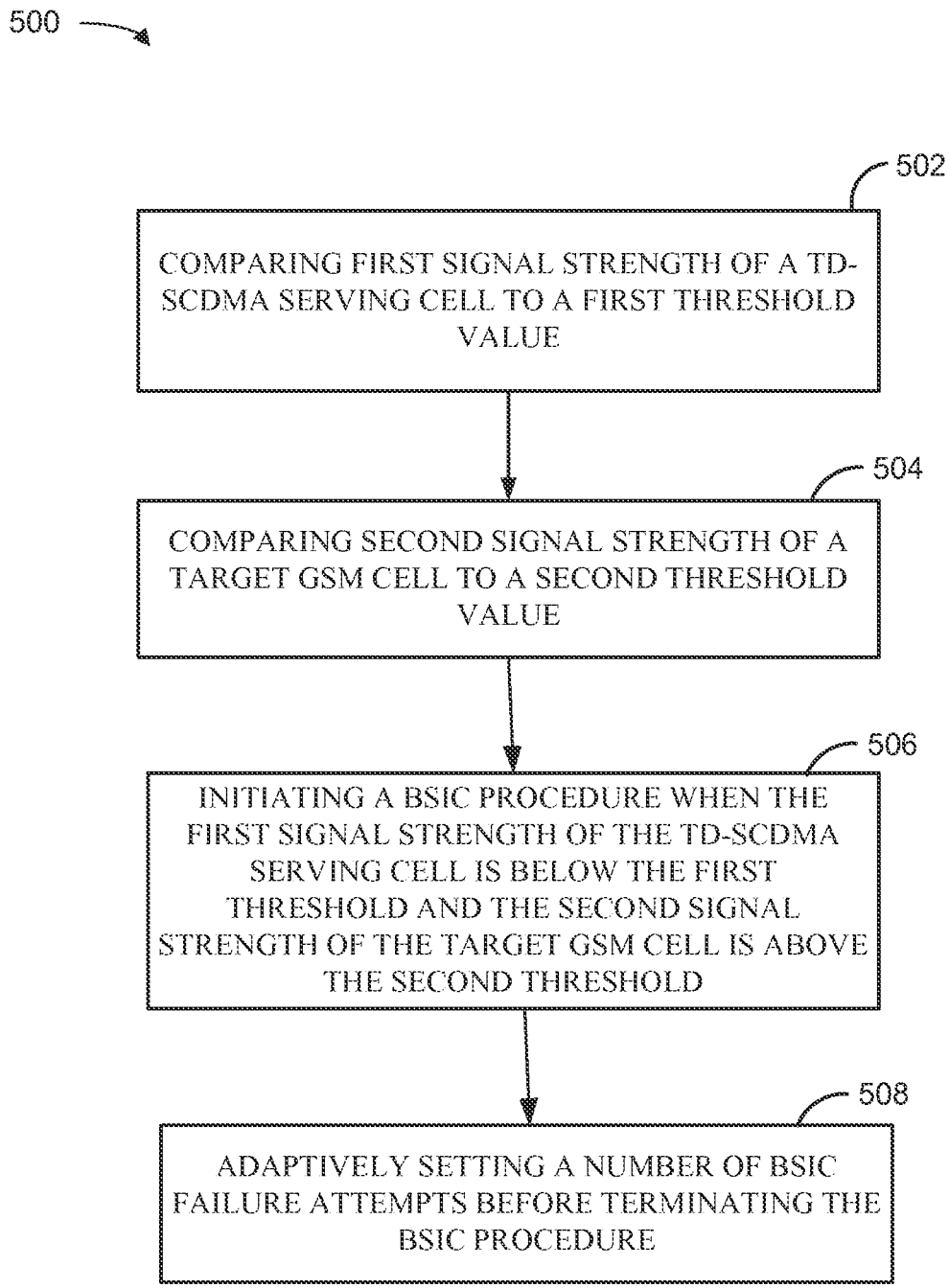
FIG. 5 is a block diagram illustrating a method for early termination of a BSIC procedure according to one aspect of the present disclosure.

FIG. 5 shows a wireless communication method 500 according to one aspect of the disclosure that may be used for IRAT measurement. In block 502, a UE compares the received signal code power (RSCP) of a TD-SCDMA serving cell with a first threshold value. In block 504, the UE compares the received signal strength indicator (RSSI) of a target GSM cell to a second threshold value. In block 506, the UE initiates a base station identity code (BSIC) procedure when the RSCP of the serving cell is below the first threshold value and the RSSI of the target GSM cell is above the second threshold value. In block 508, the UE adaptively sets a number of BSIC failure attempts before terminating the BSIC procedure.

In one implementation, the BSIC procedure may include confirming a BSIC with the target GSM cell, and in response to the confirming of the BSIC with the GSM cell, re-confirming the BSIC with the target GSM cell. In one implementation, after block 508, a measurement report event 3A may be sent. In response to the measurement report event 3A being sent, the handover of the UE from TD-SCDMA to GSM/GERAN is triggered.

Figure 6:
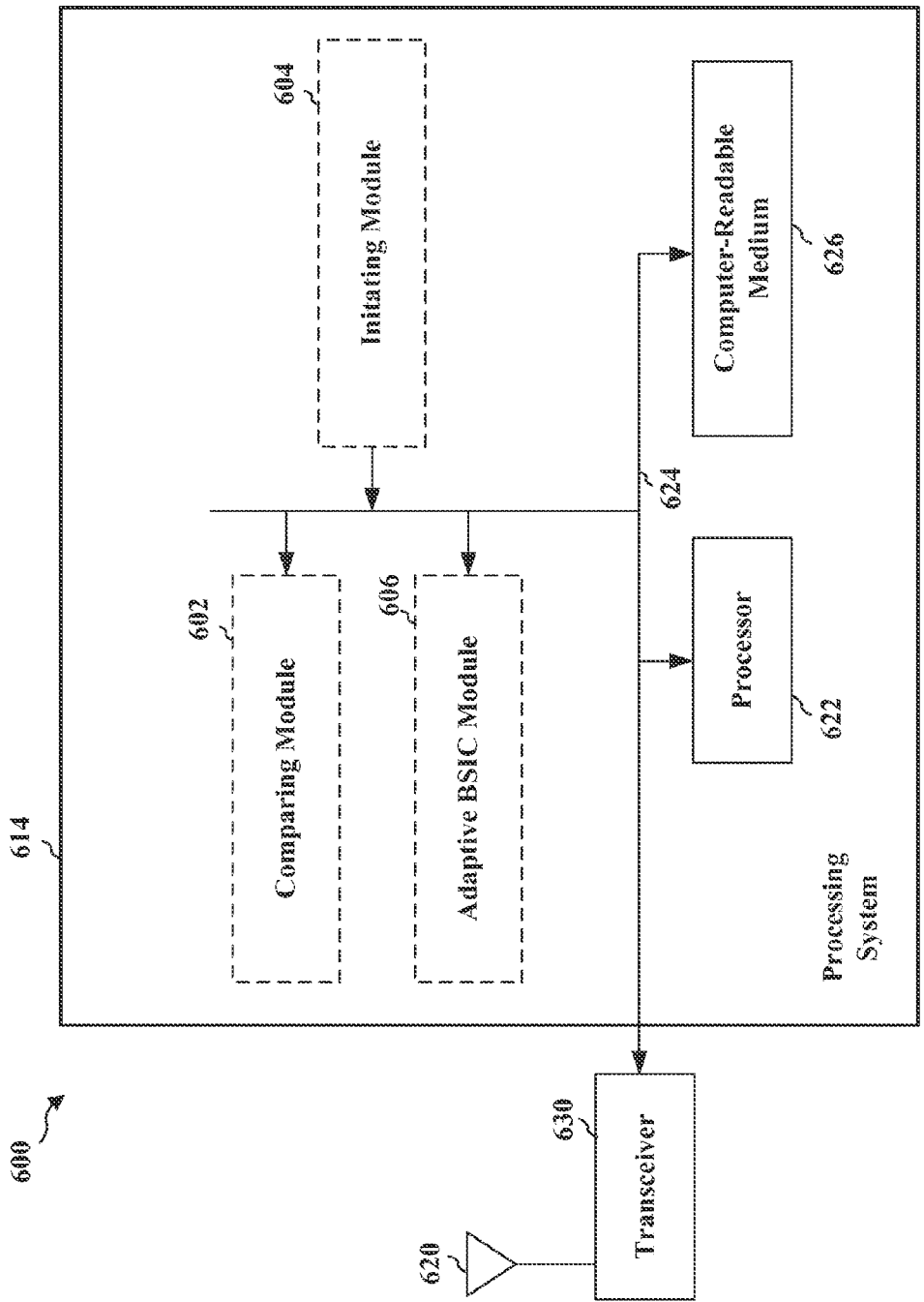
FIG. 6 is a diagram illustrating an example of a hardware implementation for an apparatus employing a processing system according to one aspect of the present disclosure.

FIG. 6 is a diagram illustrating an example of a hardware implementation for an apparatus 600 employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules 602, 604 and 606. The bus 624 may also link various other circuits such as timing sources, peripherals, voltage regulators, and power management circuits, which are well known in the art, and therefore, will not be described any further.

The apparatus includes a processing system 614 coupled to a transceiver 630. The transceiver 630 is coupled to one or more antennas 620. The transceiver 630 enables communicating with various other apparatus over a transmission medium. The processing system 614 includes a processor 622 coupled to a computer-readable medium 626. The processor 622 is responsible for general processing, including the execution of software stored on the computer-readable medium 626. The software, when executed by the processor 622, causes the processing system 614 to perform the various functions described for any particular apparatus. The computer-readable medium 626 may also be used for storing data that is manipulated by the processor 622 when executing software.

The processing system 614 includes a comparing module 602, for comparing the RSCP of a serving cell to a first threshold value and comparing the RSSI of a target cell to a second threshold value. The processing system 614 also includes an initiating module 604 for initiating a BSIC procedure and an adaptive BSIC module 606 for setting the number of BSIC failure attempts. The modules may be software modules running in the processor 622, resident/stored in the computer readable medium 626, one or more hardware modules coupled to the processor 622, or some combination thereof. The processing system 614 may be a component of the UE 350 and may include the memory 392, and/or the controller/processor 390.

In one configuration, an apparatus such as a UE 350 is configured for wireless communication including means for comparing the RSCP of a serving cell to a first threshold value and means for comparing the RSSI of a target cell to a second threshold value. In one configuration, the comparing means may be the controller/processor 390 and/or memory 392 configured to perform the functions recited by the comparing means. The UE 350 is also configured to include a means for initiating a BSIC procedure. The initiating means may be the controller/processor 390 and/or memory 392 configured to perform the functions recited by the initiating means. The UE 350 is also configured to include a means for adaptively setting a number of BSIC failure attempts. In one configuration, the adaptively setting means may be the antennas 352, the receiver 354, the channel processor 394, the receive frame processor 360, the receive processor 370, the transmitter 356, the transmit frame processor 382, the transmit processor 380, the controller/processor 390, the memory 392, BSIC process terminator module 391, BSIC process terminator module 602, and/or the processing system 614 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method, by a user equipment (UE), of wireless communication for inter radio access technology (IRAT) measurement, comprising:
    comparing a first signal strength of a time division synchronous code division multiple access (TD-SCDMA) serving cell with a first threshold, in which the first threshold is a sum of a network indicated threshold and a user equipment (UE) threshold;
    comparing a second signal strength of a target global system for mobile communications (GSM) cell to a second threshold, in which the second threshold is a difference between the network indicated threshold and the UE threshold;
    initiating a base station identity code (BSIC) procedure when the first signal strength is below the first threshold and the second signal strength is above the second threshold; and
    adaptively setting a number of BSIC failure attempts before terminating the BSIC procedure.

2. The method of claim 1, in which initiating the BSIC procedure comprises:
    confirming a BSIC with the target GSM cell; and
    re-confirming the BSIC with the target GSM cell in response to the confirming of the BSIC with the target GSM cell.

3. The method of claim 1, further comprising:
    sending a measurement report event 3A to trigger handover of the UE from TD-SCDMA to GSM or GSM Edge Radio Access Network (GERAN).

4. The method of claim 1, in which the number of BSIC failure attempts is based on a received signal strength indication (RSSI) value of the target GSM cell.

5. The method of claim 1, in which the number of BSIC failure attempts is based at least one of a frequency correction channel (FCCH) signal to noise ratio (SNR) and a signal interference noise ratio (SINR).

6. The method of claim 1, in which the number of BSIC failure attempts is based on at least one of a synchronization channel (SCH) signal to noise ratio (SNR) and a signal interference noise ratio (SINR).

7. The method of claim 1, in which the number of BSIC failure attempts is based on a property of a first radio access technology (RAT), the property comprising at least one of a measurement gap length created by network idle time slots and a gap occurrence rate.

8. The method of claim 1, in which the number of BSIC failure attempts is based on a number of GSM neighbor cells adjacent to a network serving cell.

9. The method of claim 1, in which the first signal strength comprises a received signal code power (RSCP).

10. The method of claim 1, in which the second signal strength comprises a received signal strength indication (RSSI).

11. An apparatus for wireless communication, comprising:
    a memory; and
    at least one processor coupled to the memory, the at least one processor being configured:

to compare a first signal strength of a time division synchronous code division multiple access (TD-SCDMA) serving cell with a first threshold, in which the first threshold is a sum of a network indicated threshold and a user equipment (UE) threshold;

to compare a second signal strength of a target global system for mobile communications (GSM) cell to a second threshold, in which the second threshold is a difference between the network indicated threshold and the UE threshold;

to initiate a base station identity code (BSIC) procedure when the first signal strength is below the first threshold and the second signal strength is above the second threshold; and to adaptively set a number of BSIC failure attempts before terminating the BSIC procedure.

12. The apparatus of claim 11, in which the at least one processor configured to initiate the BSIC procedure is further configured:

to confirm a BSIC with the target GSM cell; and to re-confirm the BSIC with the target GSM cell in response to the confirming of the BSIC with the target GSM cell.

13. The apparatus of claim 11, in which the at least one processor is further configured to send a measurement report event 3A to trigger handover of the apparatus from TD-SCDMA to GSM or GSM Edge Radio Access Network (GE-RAN).

14. The apparatus of claim 11, in which the number of BSIC failure attempts is based on a received signal strength indication (RSSI) value of the target GSM cell.

15. The apparatus of claim 11, in which the number of BSIC failure attempts is based on at least one of a frequency correction channel (FCCH) signal to noise ratio (SNR) and a signal interference noise ratio (SINR).

16. The apparatus of claim 11, in which the number of BSIC failure attempts is based on at least one of a synchronization channel (SCH) signal to noise ratio (SNR) and a signal interference noise ratio (SINR).

17. The apparatus of claim 11, in which the number of BSIC failure attempts is based on a property of a first radio access technology (RAT), the property comprising at least one of a measurement gap length created by network idle time slots and a gap occurrence rate.

18. The apparatus of claim 11, in which the number of BSIC failure attempts is based on a number of GSM neighbor cells adjacent to a network serving cell.

19. The apparatus of claim 11, in which the first signal strength comprises a received signal code power (RSCP).

20. The apparatus of claim 11, in which the second signal strength comprises a received signal strength indication (RSSI).

21. An apparatus for wireless communications, comprising:

means for comparing a first signal strength of a time division synchronous code division multiple access (TD-SCDMA) serving cell with a first threshold, in which the first threshold is a sum of a network indicated threshold and a user equipment (UE) threshold;

means for comparing a second signal strength of a target global system for mobile communications (GSM) cell to a second threshold, in which the second threshold is a difference between the network indicated threshold and the UE threshold;

means for initiating a base station identity code (BSIC) procedure when the first signal strength is below the first threshold and the second signal strength is above the second threshold; and means for adaptively setting a number of BSIC failure attempts before terminating the BSIC procedure.

22. A computer program product for wireless communication in a wireless network, comprising:

a non-transitory computer-readable medium having non-transitory program code recorded thereon, the program code comprising:

program code to compare a first signal strength of a time division synchronous code division multiple access (TD-SCDMA) serving cell with a first threshold, in which the first threshold is a sum of a network indicated threshold and a user equipment (UE) threshold;

program code to compare a second signal strength of a target global system for mobile communications (GSM) cell to a second threshold, in which the second threshold is a difference between the network indicated threshold and the UE threshold;

program code to initiate a base station identity code (BSIC) procedure when the first signal strength is below the first threshold and the second signal strength is above the second threshold; and program code to adaptively set a number of BSIC failure attempts before terminating the BSIC procedure.

* * * * *